Sept. 12, 1933.　　　C. L. YOST ET AL　　　1,926,928
POWER DRIVEN TRUCK
Filed June 5, 1930　　2 Sheets-Sheet 1
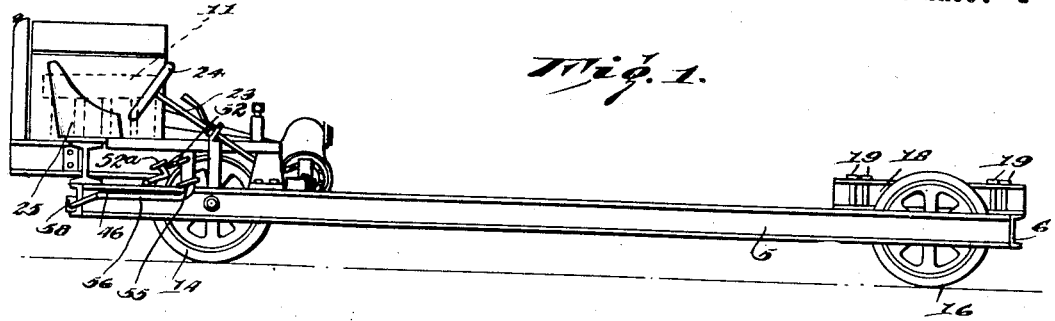
Fig. 1.
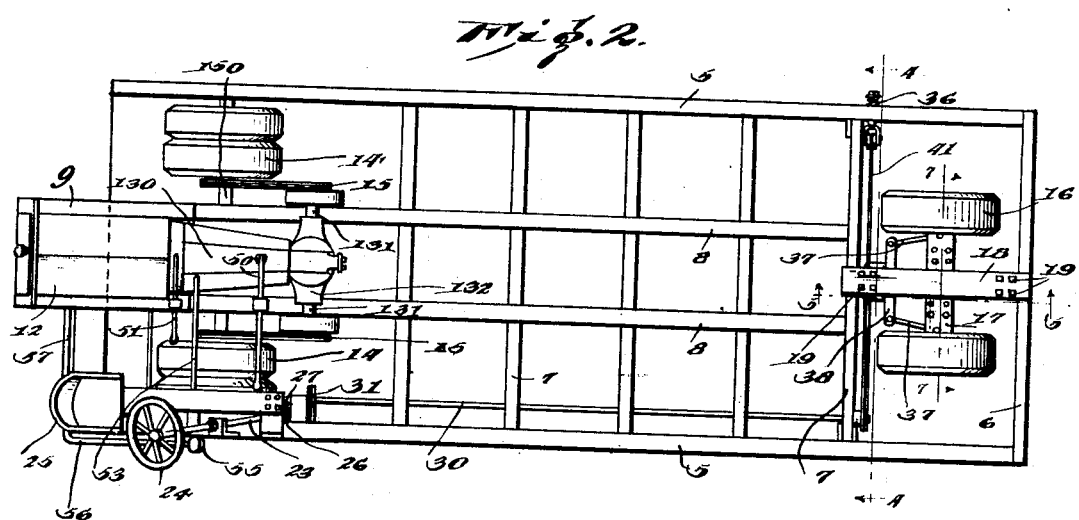
Fig. 2.
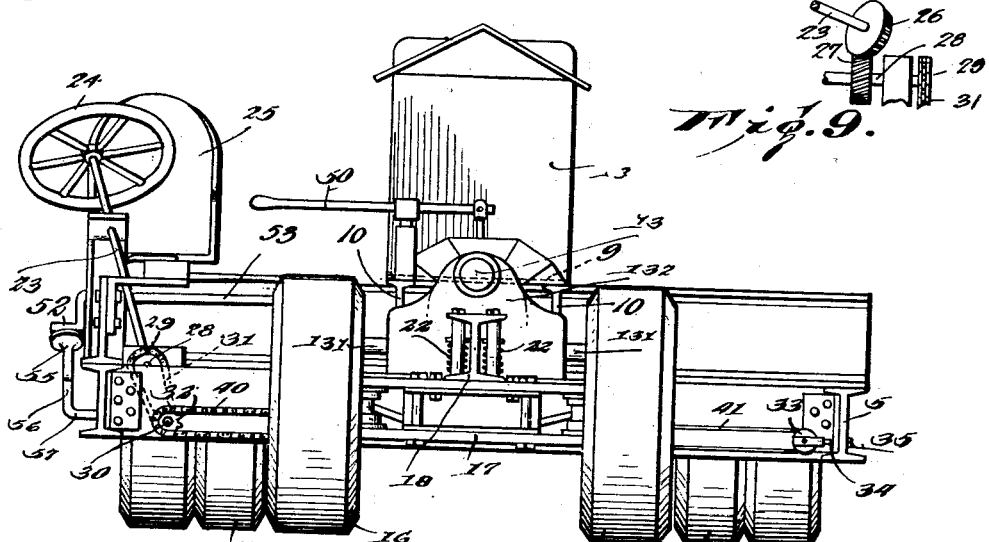
Fig. 3.
Fig. 9.
WITNESS
C. H. Mann
INVENTOR
Calvin L. Yost
BY Atlos V. Yost,
Munn & Co.
ATTORNEY

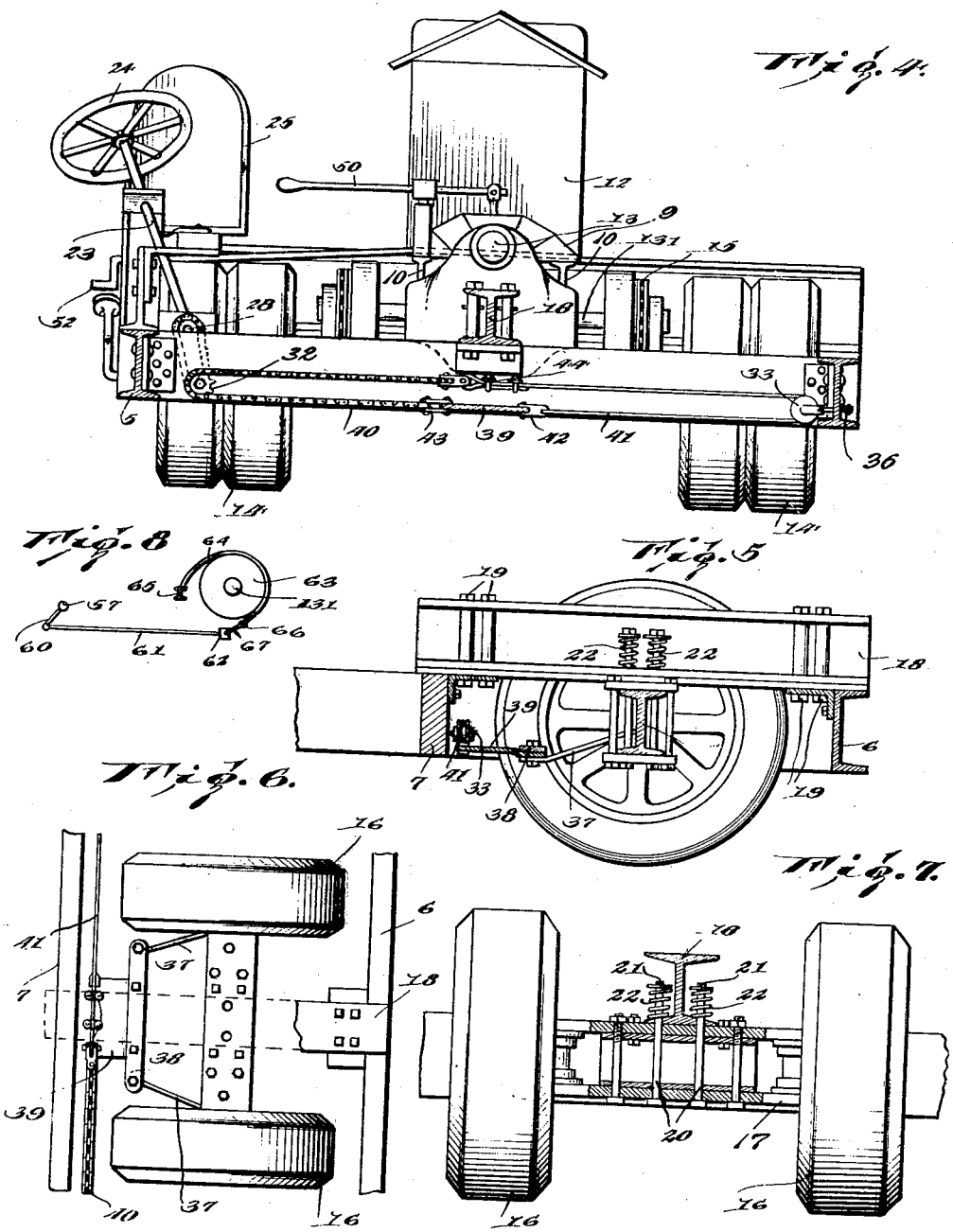

Patented Sept. 12, 1933

1,926,928

UNITED STATES PATENT OFFICE 1,926,928

POWER DRIVEN TRUCK

Calvin L. Yost and Attos V. Yost, Decatur, Ind.

Application June 5, 1930. Serial No. 459,295

1 Claim. (Cl. 180—1)

Our invention relates to power driven trucks and more particularly to a self propelled vehicle adapted for hauling heavy loads such as cranes, steam shovels, concrete mixers, etc.

An object of the present invention is to provide a truck embodying a wheeled frame which is built to sustain a maximum load and is provided with a power plant and a steering mechanism.

Further the invention provides a truck wherein one pair of the wheels are removable to permit the frame to lie at an incline with one end in contact with the ground so that a machine such as a portable road roller or any machine that will not straddle the front wheels can be driven thereon.

Another object of the invention is to provide a steering mechanism whereby the front wheels of the truck may be controlled by the operator from a remote point of the truck.

The invention also contemplates a floating or resilient mounting for the steering wheels which obviates twisting or straining of the frame or body of the truck in the event that one of the wheels passes over an obstruction or depression in the roadway.

With the preceding and other objects and advantages in mind, the invention consists in the novel combination of elements, constructions and arrangements of parts and operations to be hereinafter more fully described, claimed and illustrated in the accompanying drawings, wherein:

Figure 1 is a side elevation of my improved truck;

Fig. 2 is a top plan view of the same;

Fig. 3 is a front elevation with the forward beam of the truck frame removed;

Figure 4 is a transverse sectional view taken on the line 4—4 of Fig. 2;

Fig. 5 is an enlarged detail section taken on line 5—5 of Fig. 2;

Fig. 6 is an enlarged detail view of the steering wheels and part of the steering mechanism;

Fig. 7 is a view taken on substantially the line 7—7 of Fig. 2; and

Fig. 8 is a side view of a braking mechanism shown more or less diagrammatically.

Fig. 9 is a detailed side view of the steering gears.

Referring to the invention in detail a horizontal frame of rectangular configuration and composed of parallel side I-beams 5 connected by end channel members 6 is provided. A plurality of parallel transversely extending I-beams 7 connect the I-beams 5 while a plurality of longitudinally extending I-beams 8 extend from the foremost transverse I-beam 7 to the rear channel member 6. The beams 7 and 8 serve as a supporting structure upon which boards are adapted to be placed to support the load.

At the rear end of the frame is a platform 9 which is supported on parallel I-beams 10 extending transversely of the frame. A suitable power plant 11 is arranged on the platform 9 and is encased within a housing 12. A worm gear shaft 13 extends rearwardly from the transmission 130 and is operatively connected with transversely extending jack shafts 131 supported beneath the platform 9. These shafts project from opposite ends of a differential 132. Ground engaging wheels 14 are provided for the rear end of the frame and which are driven from the shaft 131 by sprocket chains 15 and through the axle 150.

The front or steering wheels 16 are arranged within the confines of the frame and are mounted for oscillatory movement upon the ends of a transversely extending I-beam 17. The I-beam 17 is so arranged as to prevent straining or twisting of the frame when either of the wheels 16 passes over an obstruction or depression in the roadway. To that end an I-beam 18 is arranged at right angles to the I-beam 17 at the center of the latter and has its ends anchored to one of the channel members 6 and the adjacent transverse beams as indicated at 19. A plurality of bolts 20 extend vertically through the flanges of the I-beams 17 and 18 as disclosed in Fig. 7. Nuts 21 are arranged upon the upper ends of these bolts and encircling these upper ends are expansible springs 22 which bear against the nut 21 and the flanges of the I-beam 18. It will thus be seen that the beams 17 and 18 are yieldably connected together so that the beam 17 may rock without transmitting strain to the frame.

A steering mechanism is provided for the wheels 16 and comprises a steering post 23 which is supported at one side of the platform 9 and is equipped with a steering wheel 24 which is located in close proximity to the driver's seat 25. A pinion 26 is carried by the lower end of the steering wheel which engages a pinion 27 fixed to a horizontally extending shaft 28. The shaft 28 carries a sprocket wheel 29 at its outer end. Extending longitudinally of the frame and journalled therein is a horizontally extending shaft 30. The shaft 30 is rotated by means of a sprocket chain 31 which is trained about the sprocket wheel 29. The forward end of the shaft 30 terminates slightly in arrear of the wheels 16 and is provided with a sprocket wheel 32. As disclosed in Fig. 4 the sprocket wheel 32 is located in close proximity to one of the side I-beams 5 and arranged adjacent the other I-beam 5 and disposed in horizontal alinement with the sprocket wheel 32 is a pulley 33. The pulley 33 is provided with a shank 34 which loosely passes through the web of the adjacent I-beam 5. A nut 35 is carried by the outer end of the shank 34 and bearing against this nut is an expansible spring 36 which also bears against the web of the I-beam to resiliently urge the pulley away from the sprocket wheel 32. Rigid with each of the steering wheels 16 is a rearwardly extending steering arm 37 which is pivotally connected with a transversely shiftable bar 38, the latter being formed with a horizontally disposed plate 39. A sprocket chain 40 is trained about the sprocket wheel 32 while a cable 41 is trained about the pulley 33. One end of the cable is anchored to the plate as at 42 and likewise one end of the sprocket chain 40 is anchored to the plate as at 43. The opposite end of the cable and the opposite end of the sprocket chain are united in a suitable manner as designated at 44. It will be observed that rotation of the steering wheel shifts the sprocket chain 40 and cable 41 transversely of the frame to correspondingly shift the bar 38 which in turn moves the wheels 16 in synchronism in the desired direction.

Arranged adjacent the driver's seat 25 are a pair of shifting levers 50 and 51 which control the transmission and the forward and rearward speeds. The transmission provides for five speeds, and these several levers are so arranged that they may be conveniently operated for regulating speed of the vehicle.

A clutch pedal 52 is connected with a rod 53, and this rod in turn controls the clutch, said pedal is located in a convenient position where it may be readily reached by the foot of the operator.

A pedal 55 located below the pedal 52 is at the free end of a rod 56 which extends rearwardly along one of the I-beams 5 and is connected with a rock shaft 57 extending rearwardly of the rear I-beam 6 and mounted in bearings 58 supported by said I-beam. A lever 60 depends from the rock shaft 57 and is pivotally connected at its free end to a link 61 which extends forwardly beneath the engine. The link in turn is connected with an equalizing rod 62 mounted for movement beneath the brake drums 63 which are secured to the jack shafts 131. A brake band 64 is trained on each brake drum and has one end secured to a fixed part of the frame 65. The other end of each brake band is connected at 66 to a respective rod 67 which is secured to an end of the equalizing rod 62.

An accelerator pedal 52$^a$ is shown for controlling the speed of the engine It will be noted that when the pedal 55 is depressed the shaft 57 will be rocked, thereby causing the lever 60 to exert a pull on the link 61 and the equalizing rod 62. Consequent shifting of these elements will cause the brake band 64 to be drawn up tight upon the brake drums 63 and thereby prevent further movement of the vehicle after the clutch pedal 52 has been operated.

When it is desired to load the truck the front wheels 16 can be demounted so that the frame may assume an inclined position with its forward end resting on the ground. In this position the truck will be loaded with machinery which will not straddle the front wheels such for example as a portable road roller. Otherwise all other machinery such as cranes may be loaded from the front end without demounting the front wheels. After the load in the first instance has been placed in position the front end of the truck is jacked up and the wheels placed in operative position.

What is claimed is:

In a truck for transporting heavy machinery, a substantially rectangular frame, front and rear ground engaging wheels for supporting said frame, a transverse bar spaced from an end bar of the frame and secured to the side bars of said frame, means for pivotally and centrally supporting the front ground engaging wheels from the end and transverse bars, spaced longitudinally disposed bars located centrally of the frame and having the rear ends secured to the rear end bar of the frame, the opposite ends of the longitudinal bars being secured to the transverse bar, a motor supported by the rear ends of the longitudinal bars, the rear ground engaging wheels being disposed laterally of the motor, said frame surrounding the wheels and located substantially in a horizontal plane passing through the axes of the wheels.

CALVIN L. YOST.
ATTOS V. YOST.